United States Patent
Chen et al.

(10) Patent No.: US 9,774,650 B2
(45) Date of Patent: Sep. 26, 2017

(54) FRAME PRIORITY SYSTEM

(71) Applicant: Cisco Technology, Inc., San Jose, CA (US)

(72) Inventors: Sijia Chen, Hangzhou (CN); Li Yao, Hangzhou (CN); Huade Shi, Hangzhou (CN); Yang Hu, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 503 days.

(21) Appl. No.: 14/493,408

(22) Filed: Sep. 23, 2014

(65) Prior Publication Data

US 2016/0088051 A1    Mar. 24, 2016

(51) Int. Cl.

| | |
|---|---|
| *H04L 29/06* | (2006.01) |
| *H04N 19/136* | (2014.01) |
| *H04N 19/172* | (2014.01) |
| *H04N 19/102* | (2014.01) |
| *H04N 19/37* | (2014.01) |
| *H04N 19/137* | (2014.01) |
| *H04N 19/164* | (2014.01) |

(52) U.S. Cl.
CPC ......... *H04L 65/607* (2013.01); *H04N 19/102* (2014.11); *H04N 19/136* (2014.11); *H04N 19/137* (2014.11); *H04N 19/164* (2014.11); *H04N 19/172* (2014.11); *H04N 19/37* (2014.11)

(58) Field of Classification Search
CPC .................................................... H04L 65/607
See application file for complete search history.

(56) References Cited

U.S. PATENT DOCUMENTS

| | | | |
|---|---|---|---|
| 6,674,477 B1 * | 1/2004 | Yamaguchi | H04L 1/1854 |
| | | | 348/387.1 |
| 7,093,028 B1 | 8/2006 | Shao et al. | |
| 7,720,065 B2 | 5/2010 | Liu et al. | |
| 2006/0168133 A1 | 7/2006 | Park et al. | |
| 2007/0053445 A1 | 3/2007 | Schaar et al. | |
| 2010/0017530 A1 | 1/2010 | Gaur | |
| 2010/0027428 A1 | 2/2010 | Choi et al. | |
| 2013/0166650 A1 | 6/2013 | Chen et al. | |
| 2013/0287023 A1 | 10/2013 | Bims | |
| 2014/0152869 A1 * | 6/2014 | Solotko | G06Q 10/10 |
| | | | 348/231.3 |

FOREIGN PATENT DOCUMENTS

WO    WO 2014/046610    3/2014

* cited by examiner

*Primary Examiner* — Adnan Mirza
(74) *Attorney, Agent, or Firm* — Samuel M. Katz

(57) ABSTRACT

In one embodiment, a system for setting frame priority according to priority levels includes a video encoder to encode a first video frame of a live video stream yielding an encoded first video frame having a first priority level, and a processor to read, from a memory, an estimate of a time delay, the time delay being a time for data in the live video stream to be transferred from a first device to a second device, and determine if the estimate of the time delay exceeds a pre-defined delay, and wherein if the estimate of the time delay exceeds the pre-defined delay, the video encoder is operative to encode a second video frame with a higher priority level than the first priority level, the second video frame being a most recent video frame to be presented from the live video stream for encoding after the first video frame. Related apparatus and methods are also described.

21 Claims, 6 Drawing Sheets

FRAME PRIORITY SYSTEM

TECHNICAL FIELD

The present disclosure generally relates to assigning priority to video frames.

BACKGROUND

In real time communication, for example, but not limited to, in a collaboration product, delay may be the key to the competitiveness of a product. The delay typically includes the time difference between capturing/encoding of a video frame at a sender and receiving/decoding of the video frame at a receiver. Minimization of the delay can add critical business value to collaboration, or other real-time communication, products.

In a client-server system for multipoint communication, the delay is mainly the sum of uplink delay and downlink delay, which represents the time for sending the frame from a sender to a server, and the time for sending the frame from the server to a receiver, respectively, as given the limitation of available bandwidth, the time used for encoding and decoding is generally negligible compared to the transmission time.

Minimizing uplink delay may be achieved by higher encoding efficiency. Practically speaking, rate control may be applied to control the outcome of the encoder to adapt to uplink bandwidth, but typically at the price of quality fluctuation. When a fixed required quality is taken as a premise, coding efficiency is essential.

Minimizing downlink delay typically becomes more complex when downlinks are at different bandwidths in a multi-point system. US Published Patent Application 2013/0166650 of Chen, et al. and a priority-driven switch of U.S. patent application Ser. No. 14/272,821 of Chen, at al., utilize the concept of key-frame layer or priority layer to make the control of the downlink delay possible.

BRIEF DESCRIPTION OF THE DRAWINGS

The present disclosure will be understood and appreciated more fully from the following detailed description, taken in conjunction with the drawings in which.

DESCRIPTION OF EXAMPLE EMBODIMENTS

Overview

Figure 1:
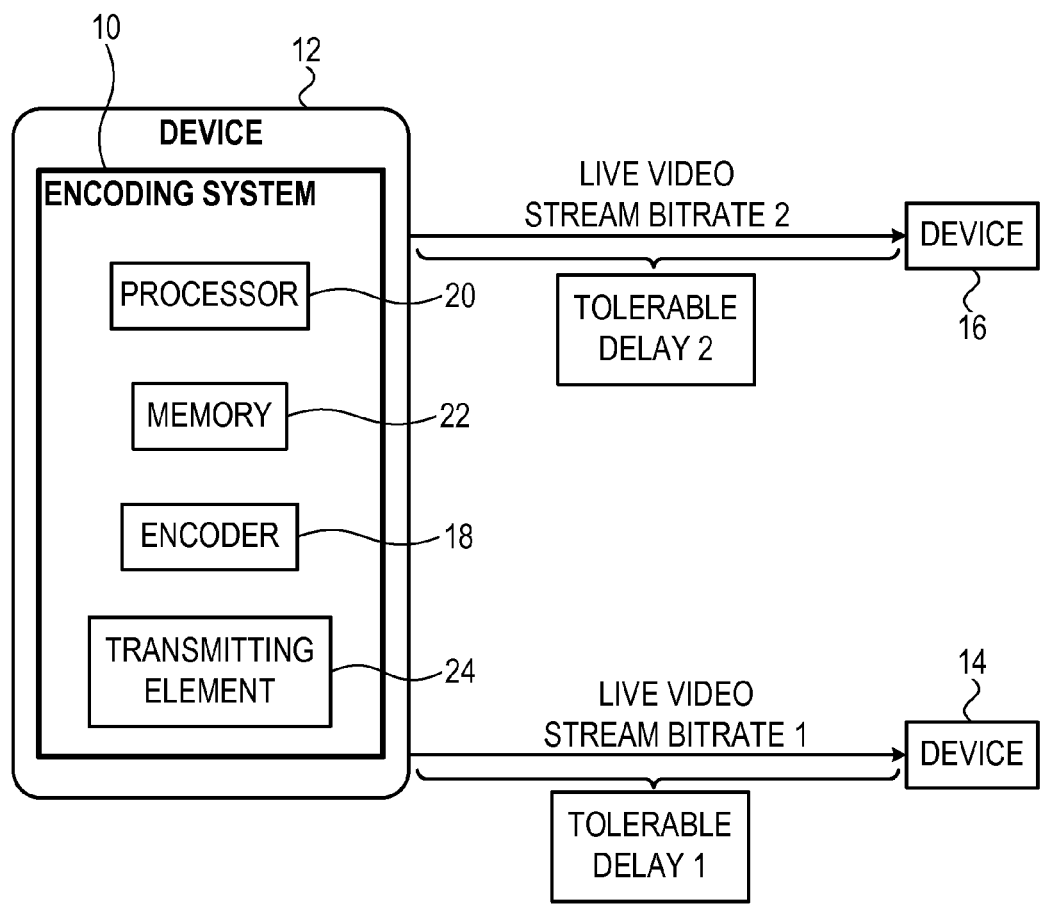
FIG. 1 is a partly pictorial, partly block diagram view of a frame priority video encoding system constructed and operative in accordance with an embodiment of the present invention.

There is provided in accordance with an embodiment of the present invention, a frame priority video encoding system for setting frame priority according to a plurality of priority levels including a video encoder to encode a first video frame of a live video stream yielding an encoded first video frame having a first priority level, and a processor to read, from a memory, an estimate of a time delay, the time delay being a time for data in the live video stream to be transferred from a first device to a second device, and determine if the estimate of the time delay exceeds a pre-defined delay, and wherein if the estimate of the time delay exceeds the pre-defined delay, the video encoder is operative to encode a second video frame yielding an encoded second video frame with a higher priority level than the first priority level, the second video frame being a most recent video frame to be presented from the live video stream for encoding after the first video frame.

Encoded Versus Encrypted

The term "encoded" is used throughout the present specification and claims, in all of its grammatical forms, to refer to any type of data stream encoding including, for example and without limiting the scope of the definition, well known types of encoding such as, but not limited to, MPEG-2 encoding, H.264 encoding, VC-1 encoding, and synthetic encodings such as Scalable Vector Graphics (SVG) and LASER (ISO/IEC 14496-20), and so forth. It is appreciated that an encoded data stream generally requires more processing and typically more time to read than a data stream which is not encoded. Any recipient of encoded data, whether or not the recipient of the encoded data is the intended recipient, is, at least in potential, able to read encoded data without requiring cryptanalysis. It is appreciated that encoding may be performed in several stages and may include a number of different processes, including, but not necessarily limited to: compressing the data; transforming the data into other forms; and making the data more robust (for instance replicating the data or using error correction mechanisms).

The term "compressed" is used throughout the present specification and claims, in all of its grammatical forms, to refer to any type of data stream compression. Compression is typically a part of encoding and may include image compression and motion compensation. Typically, compression of data reduces the number of bits comprising the data. In that compression is a subset of encoding, the terms "encoded" and "compressed", in all of their grammatical forms, are often used interchangeably throughout the present specification and claims.

Similarly, the terms "decoded" and "decompressed" are used throughout the present specification and claims, in all their grammatical forms, to refer to the reverse of "encoded" and "compressed" in all their grammatical forms.

The terms "scrambled" and "encrypted", in all of their grammatical forms, refer to any appropriate scrambling and/or encryption methods for scrambling and/or encrypting a data stream, and/or any other appropriate method for intending to make a data stream unintelligible except to an intended recipient(s) thereof. Well known types of scrambling or encrypting include, but are not limited to DES, 3DES, and AES. Similarly, the terms "descrambled" and "decrypted" are used throughout the present specification and claims, in all their grammatical forms, to refer to the reverse of "scrambled" and "encrypted" in all their grammatical forms.

Pursuant to the above definitions, the terms "encoded"; "compressed"; and the terms "scrambled" and "encrypted" are used to refer to different and exclusive types of processing. Thus, a particular data stream may be, for example:

encoded, but neither scrambled nor encrypted;
compressed, but neither scrambled nor encrypted;
scrambled or encrypted, but not encoded;
scrambled or encrypted, but not compressed;
encoded, and scrambled or encrypted; or
compressed, and scrambled or encrypted.

Likewise, the terms "decoded" and "decompressed" on the one hand, and the terms "descrambled" and "decrypted" on the other hand, are used to refer to different and exclusive types of processing.

Definitions

A "reference frame", as used in the specification and claims, is defined as follows. If the decoding of a first video frame is at least partially dependent on video data of a second, now decompressed, video frame, then the second video frame is a reference frame of the first video frame. In older video encoding standards, such as MPEG-2, only one reference frame was used for P-frames and two reference frames were used for B-frames. Some modern video encoding standards, such as H.264/AVC, allow the use of multiple reference frames. This allows the video encoder to choose among more than one previously decoded frame on which to base each macroblock in the next frame. While the best frame for this purpose is usually the previous frame, the extra reference frames can improve compression efficiency and/or video quality. Note that different reference frames can be chosen for different macroblocks in the same frame. The maximum number of concurrent reference frames supported by H.264 is 16. Different reference frames can be chosen for a macroblock. Another video format that supports multiple reference frames is Snow, which can handle up to eight. The Theora codec provides a limited form of multiple reference frames, allowing references to both the preceding frame and the most recent intra frame.

DESCRIPTION CONTINUED

Reference is now made to FIG. 1, which is a partly pictorial, partly block diagram view of a frame priority video encoding system 10, constructed and operative in accordance with an embodiment of the present invention.

The frame priority video encoding system 10 is typically embodied in a transmitting device 12, for example, but not limited to, a sender in a collaboration system or a server in a content serving system which delivers streaming content, for example, live streaming content. The device 12 may also be configured as a receiving device, in order to participate in two-way collaboration sessions.

The device 12 typically transfers content to a number of other devices including a device 14 and a device 16, which may be devices participating in a collaboration session or devices receiving any suitable streaming content.

The devices 14, 16 may have different bandwidth receiving capabilities either due to the devices themselves or the communication path between the device 12 and the devices 14, 16. Therefore, the video encoder 18 of the device 12 may be operative to prepare the same video content for sending to the devices 14, 16 using different bitrate streams with respective different levels of video quality. So for example, the device 14 may receive a live video stream with bitrate 1, and the device 16 may receive a live video stream with bitrate 2 from the device 12. The live video stream for bitrate 1 has a lower bitrate, and may also include fewer frames, than the live video stream for bitrate 2.

The transfer of the content may be via an intermediary buffer or server or cache (not shown), for example, but not limited to, via the priority-driven switch described with reference to U.S. application Ser. No. 14/272,821 of Chen, at al. Additionally, or alternatively, the frame priority video encoding system 10 may be implemented in conjunction with the mechanism of US Published Patent Application 2013/0166650 of Chen, et al. Additionally, or alternatively, the frame priority video encoding system 10 may be implemented with any suitable priority aware middleware and/or routers where different priority packets are treated differently.

The frame priority video encoding system 10 typically includes a video encoder 18, a processor 20, a memory 22 and a transmitting element 24. The video encoder 18 is operative to encode video frames for the transmitting element 24 to send to the other devices including devices 14, 16. The memory 22 is operative to store data used by the processor 20.

The frame priority video encoding system 10 is operative to set frame priority according to a plurality of priority levels. In most of the examples used herein, priority level 0 is the highest priority and priority level 9 is the lowest priority. Priority level 0 may correspond to an independently encoded frame such as an IDR (Instantaneous Decoder Refresh) frame and priority level 9 may correspond to a non-reference frame. Other reference frames may have a priority in the range of 1-8, by way of example only. Therefore, the assigned priority may affect which type of frame will be encoded by the video encoder 18 even if the frame type will now be different than that defined by a set pattern such as a group of pictures (GOP) structure such as that typically used in MPEG-2, by way of example only.

The video encoder 18 is typically operative to assign the same priority level to a current video frame as was used for a previous video frame, or according to some set arrangement, such as dictated by a frame-type encoding structure (e.g. GOP structure), unless the delay between the device 12 and the other devices 14, 16 is estimated to exceed a "tolerable" delay. The delay between the device 12 and the other devices 14, 16 is a time for data in a live video stream to be transferred from the device 12 to the other devices 14, 16. If the estimated delay exceeds the tolerable delay, the frame priority video encoding system 10 performs several tests to determine what the actual priority level of the next encoded frame should be. The various tests are described in more detail with reference to FIGS. 4-7.

The tolerable delay for content sent by the device 12 to the other devices (including devices 14, 16) may be calculated based on an average tolerable delay between the device 12 and each of the other devices (including devices 14, 16). In such a case the estimated delay is typically determined as an average delay between the device 12 and each of the other devices (including devices 14, 16) and the video encoding system 10 is operative to determine the appropriate priority level for each of the video frames independently of the bitrate stream in question. In other words, the same video frame will receive the same priority for all the different bitrate streams.

It will be appreciated that the tolerable delay for different groups of devices may be determined separately. In the example of FIG. 1, the "tolerable delay" between the device 12 and the device 14 is shown as "tolerable delay 1" and the "tolerable delay" between the device 12 and the device 16 is shown as "tolerable delay 2". In such a case, the estimated delay is typically determined per group of devices receiving the same bitrate stream, and the video encoding system 10 is operative to determine the appropriate priority level for each of the video frames per bitrate stream.

By way of example only, for desktop sharing receivers, a receiver whose downlink bandwidth is 200 Kbps generally has a longer delay than a receiver whose downlink bandwidth is 1 Mbps. So the tolerable delay for the 200 Kbps receiver may be set at 10 seconds for desktop sharing, while the tolerable delay for the 1 Mbp downlink may be set at 2 seconds.

The tolerable delay for each downlink bandwidth is either user defined or calculated as a function of the downlink bandwidth.

The processor 20 is operative to determine the pre-defined "tolerable" delay of data of the live video stream of bitrate 1 and data of the live video stream of bitrate 2 being transferred from the device 12 to the device 14, and from the device 12 to the device 16, respectively, as well as the tolerable delay of any other bitrate streams. The processor 20 is optionally operative to determine an average "tolerable" delay if the frame priority video encoding system 10 is implemented to average the "tolerable" delay of the different groups of devices as described above.

For the sake of simplicity, the example described with reference to FIGS. 2-8 examines the delay of a single bitrate stream (of bitrate 1) and determines the priority level of the video frames of that bitrate stream.

Figure 2:
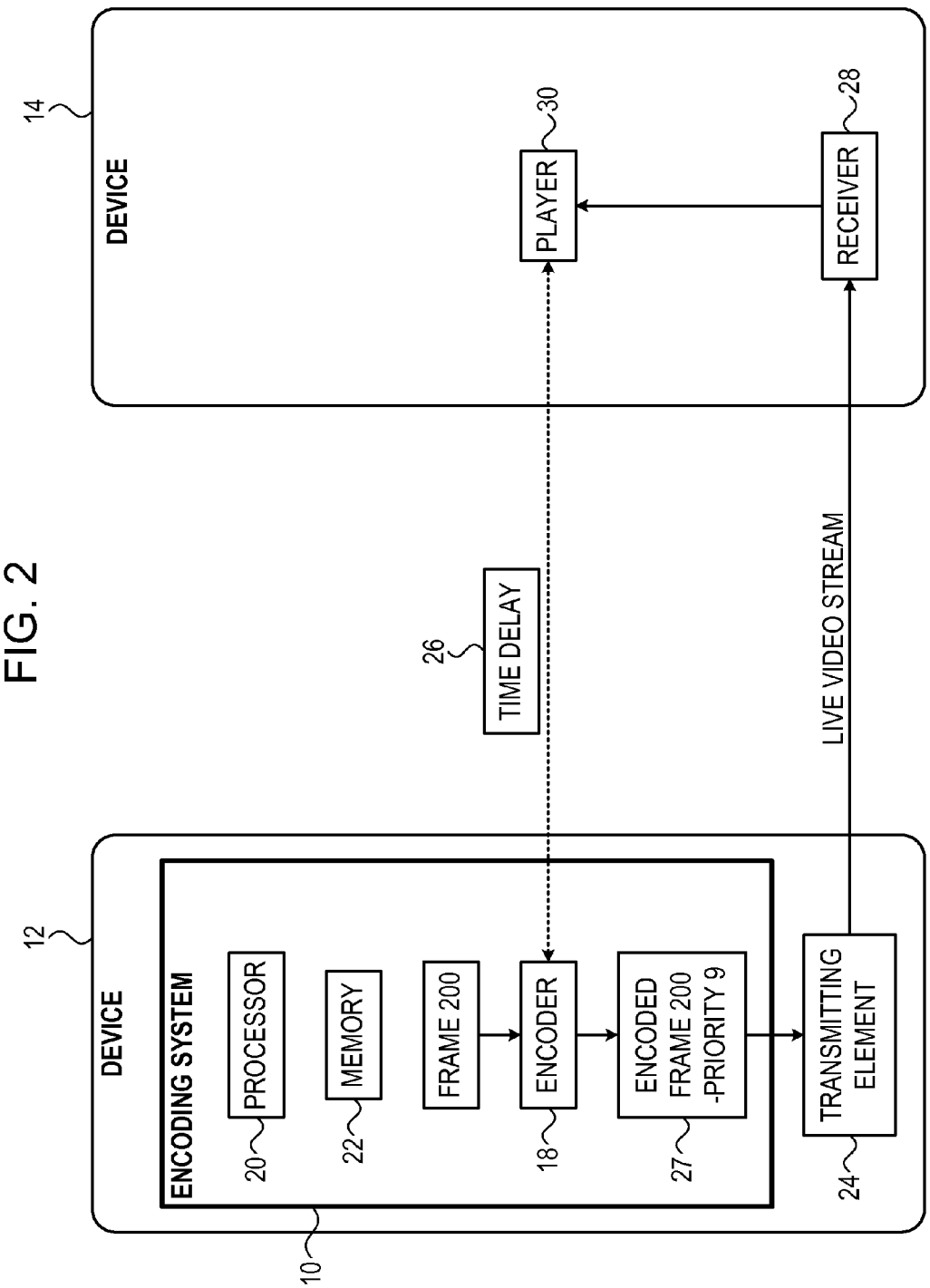
FIG. 2 is a partly pictorial, partly block diagram view illustrating an estimated time delay determined by the frame priority video encoding system of FIG. 1.

Reference is now made to FIG. 2, which is a partly pictorial, partly block diagram view illustrating an estimated time delay 26 determined by the frame priority video encoding system 10 of FIG. 1.

FIG. 2 shows the video encoder 18 receiving and encoding video frame 200 (block 27) of the live video stream (of bitrate 1) yielding an encoded video frame 200 having a priority level of 9 (the lowest priority in this example). The encoded video frame 200 is sent to the device 14 in the live video stream via the transmitting element 24. The live video stream is received by a receiver 28 in the device 14 and rendered (including decoding) by a player 30 of the device 14.

The time delay 26 from the device 12 to the device 14 is technically from the video encoder 18 of the device 12 to the player 30 of the device 14 (i.e.: from encoding of a video frame in the live video stream in the device 12 to rendering of the video frame of the live video stream by the device 14). In a collaboration system, the time delay 26 represents the time difference between when an image is displayed on a sender's screen and when the same image is displayed on a receiver's screen. As the encoding/decoding time is typically negligible compared to the uplink and downlink delay, the estimated time delay 26 may be considered as the delay from the transmitting element 24 of the device 12 to the receiver 28 of the device 14. Therefore, the time delay may be defined as the time for data in the live video stream to be transferred from an element (e.g.: encoder or transmitter) in the device 12 to an element (receiver or renderer/decoder) in the device 14.

The processor 20 is operative to estimate the time delay 26. The time delay 26 is the time for data in the live video stream to be transferred from the device 12 to the device 14. The estimated time delay 26 may be determined based on feedback from a server, cache or buffer operationally disposed between the device 12 and the devices 14, 16, or based on the amount of unsent encoded frames. By way of example, the server may calculate the uplink bit rate received from the sender, and compare the uplink bitrate with the instant downlink bandwidth, to determine the estimated time delay 26. Optionally, the server may determine the estimated time delay 26 based on checking its sending buffer to some downlinks (in the buffer there may be unsent encoded frames waiting to be sent) and the instant downlink bandwidth.

The estimated time delay 26 is stored in the memory 22 by the processor 20.

Figure 3:
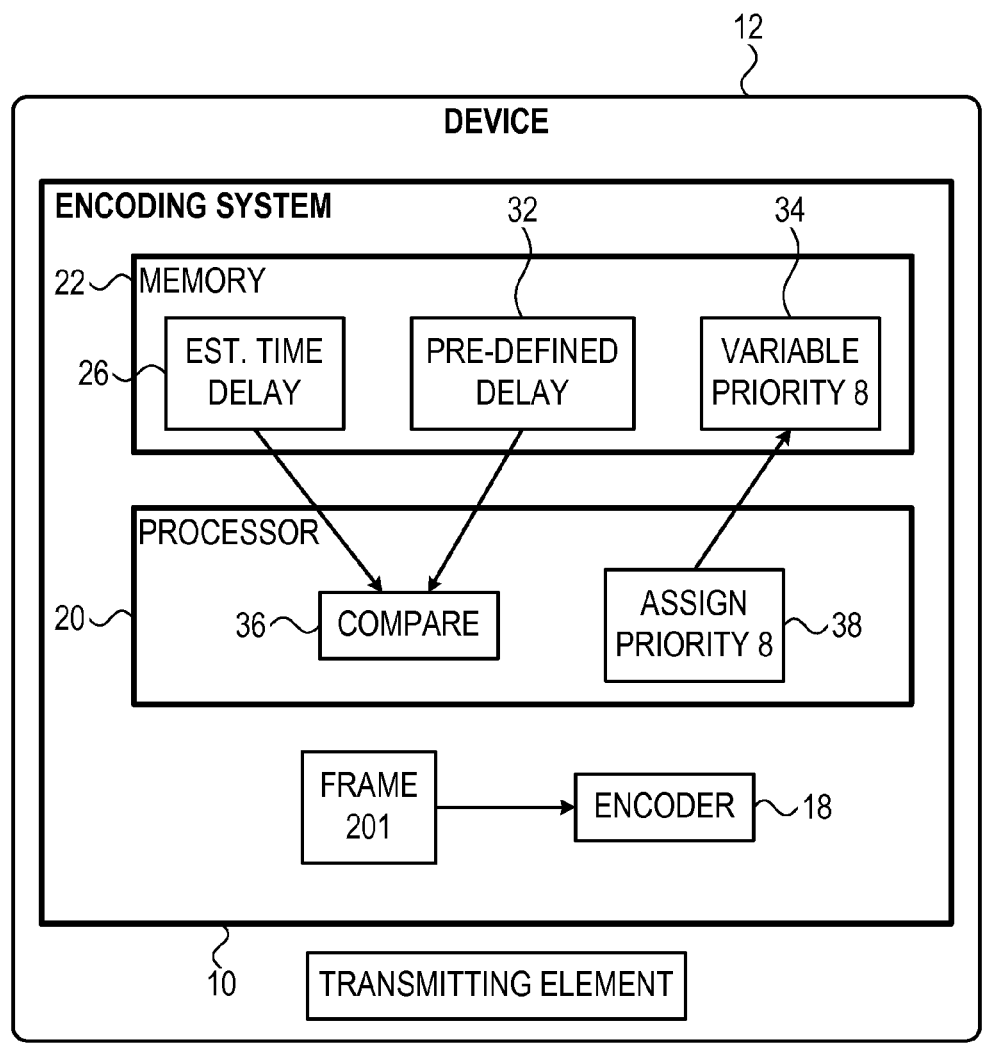
FIG. 3 is a partly pictorial, partly block diagram view of the system of FIG. 1 checking if the estimated delay is greater than a pre-defined tolerable delay.

Reference is now made to FIG. 3, which is a partly pictorial, partly block diagram view of the system 10 of FIG. 1 checking if the estimated time delay 26 is greater than a pre-defined tolerable delay 32.

After the video encoder 18 encoding video frame 200 (FIG. 2) and optionally prior to encoding video frame 201, the processor 20 is operative to read, from the memory 22, the estimated time delay 26 of the live video stream between the device 12 and the device 14 (FIG. 2) and the pre-defined tolerable delay 32 between the device 12 and the device 14 (FIG. 2).

The processor 20 is operative to compare the estimated time delay 26 and the pre-defined tolerable delay 32 to determine if the estimated time delay 26 exceeds the pre-defined tolerable delay 32 (block 36). If the estimated time delay 26 exceeds the pre-defined tolerable delay 32, the processor 20 is operative to assign (block 38) a priority level (typically one level higher than the priority level assigned to the encoded video frame 200 (FIG. 2)) to a variable 34. For example, if the priority level of the encoded video frame 200 is "9", then the value assigned to the variable 34 is "8".

The final priority level assigned to an encoded video frame depends on the outcome of a number of tests. During and/or after each test the value of the variable 34 is amended, as necessary. The final value of the variable 34 after the tests are complete is used as to determine the final priority level assigned to an encoded video frame. The tests include checking for accumulation (described in more detail with reference to FIGS. 4 and 5), checking for new information (described in more detail with reference to FIG. 6) and checking for animation (described in more detail with reference to FIG. 7). The abovementioned tests may be employed by the frame priority video encoding system 10 in any suitable combination and permutation even though the final priority level may be different depending on in which order the abovementioned tests are performed.

Figure 4:
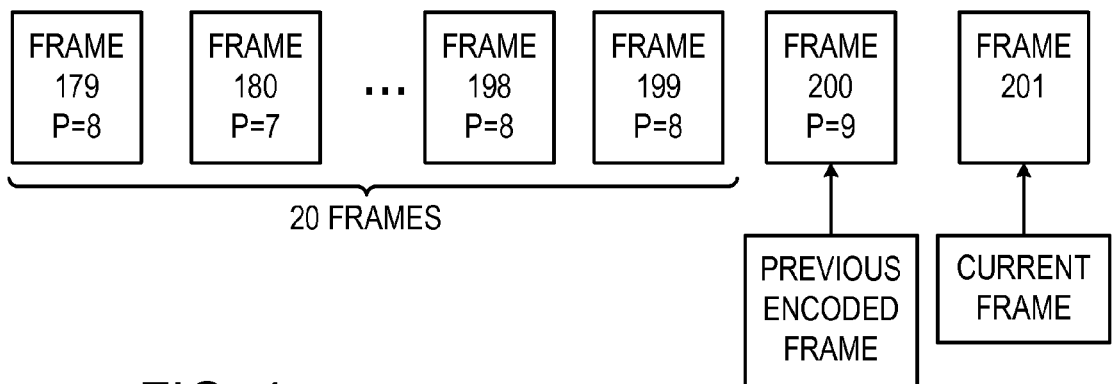
FIG. 4 is a partly pictorial, partly block diagram view illustrating checking for priority level frame accumulation in the system of FIG. 1.

Reference is now made to FIG. 4, which is a partly pictorial, partly block diagram view illustrating checking for priority level frame accumulation in the system 10 of FIG. 1.

The processor 20 (FIG. 4) is operative to: find a priority level, having a value equal to, or higher than, the value of the variable 34 (FIG. 3), such that at least X (for example 50%, 100%, 5 frames, 10 frames, 20 frames) of the previously encoded video frames within a limit (for example, the previous 10 or 21 encoded video frames or X previously encoded video frames, one-after-another, without breaks, starting from a frame immediately prior to the encoded video frame 200 (FIG. 2)) do not include that priority level; and change the value of the variable 34 to the value of that priority level.

Therefore, accumulation of frames in a priority level is defined as at least X of the previously encoded video frames within a certain limit having that priority level.

Figure 5:
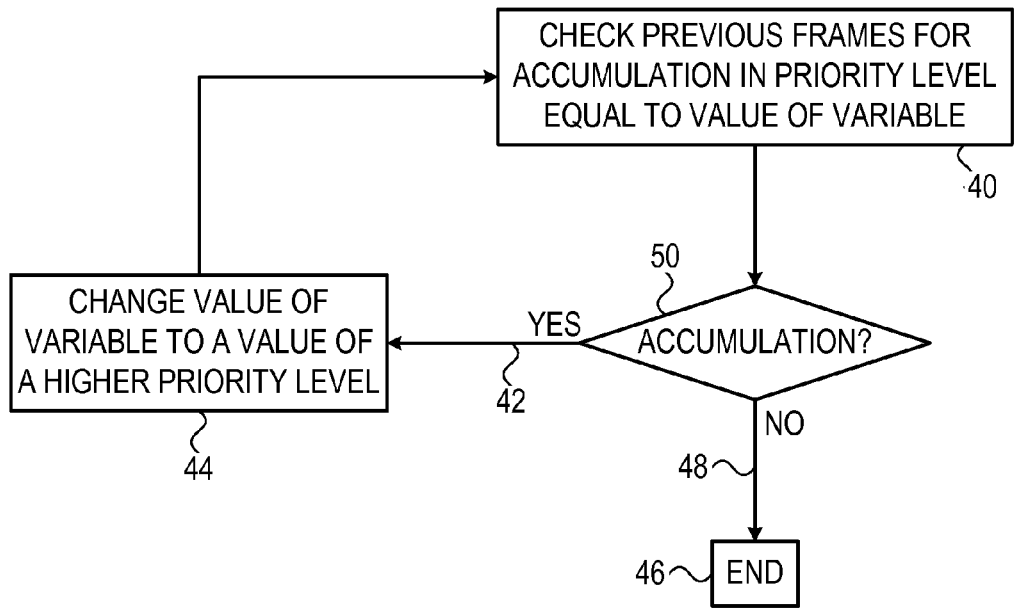
FIG. 5 is a flow chart of a method for finding a priority level without frame accumulation in the system of FIG. 1.

Reference is now made to FIG. 5, which is a flow chart of a method for finding a priority level without frame accumulation in the system 10 of FIG. 1.

In overview, a next highest priority level (having a value which is one greater than the value of the variable 34 (FIG. 3)) is examined to see whether there is an accumulation of frames in that layer. If there is an accumulation of frames then the next highest layer is examined and so on until a layer is found which is clear of accumulation.

The processor 20 (FIG. 4) is operative to: (a) check if there are more than X previously encoded video frames within a limit having a priority level equal to the value of the variable 34 (FIG. 3) (block 40); at decision block 50, (b) if there are more than X previously encoded video frames within that limit having a priority equal to the value of the variable 34 (branch 42), change the value of the variable 34 to a value of a higher priority level (block 44) and repeat step (a); and if there are not more than X previously encoded video frames within that limit having a priority equal to the value of the variable 34 (branch 48), the test is complete (block 46).

Figure 6:
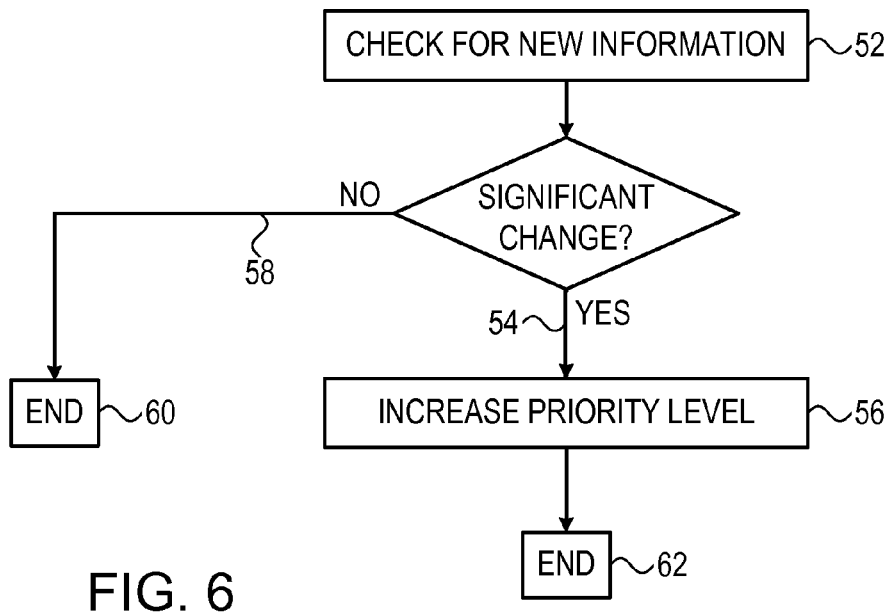
FIG. 6 is a flow chart of a method for checking for new information in the system of FIG. 1.

Reference is now made to FIG. 6, which is a flow chart of a method for checking for new information in the system 10 of FIG. 1.

The processor 20 (FIG. 4) is operative to: determine or estimate if image information in the video frame 201 (FIG. 2) has changed with respect to the video frame 200 (FIG. 2) more than a certain limit (block 52); and if it was determined or estimated that the image information in the video frame 201 has changed with respect to the video frame 200 (FIG. 2) more than that limit (branch 54), change the value of the variable 34 (FIG. 3) to a value of a higher priority level (block 56) and then the test is complete (block 62). If there was not a change above the limit (branch 58) then the test is complete without changing the value of the variable 34 (block 60). So for example, if the priority level of the previous video frame 200 (FIG. 2) was priority level 9, and the value of the variable 34 was set to the value of priority level 8 due to the estimated time delay 26 exceeding the pre-defined tolerable delay 32 and there is frame accumulation in priority level 8 so that the variable was further changed to the value of priority level 7, and now it is determined that the image information in the video frame 201 (FIG. 2) has changed with respect to the video frame 200 (FIG. 2) more than a certain limit, then the value of the variable 34 is changed again to the value of priority level 6.

The processor 20 (FIG. 4) may be operative to estimate the change in the image information between the video frame 200 (FIG. 2) and the video frame 201 (FIG. 2) based on a textual difference between an image of the first video frame and an image of the second video frame. The textual difference may include a change in title or other textual features of the image information. The textual part of an image may be isolated from the other items in the image and compared to the text included in the previous video frame. A first line or large size fonts (compared with other fonts used in the image) may be identified to look for titles to see if titles have changed between the video frames 200 (FIG. 2), 201 (FIG. 2). Therefore, in the case of textual differences, the limit to determine whether image information in the video frame 201 has changed with respect to the video frame 200 may be a change in title and/or a change in more than 25% of the words recognized in the images, by way of example only.

Additionally or alternatively, the processor 20 (FIG. 4) may be operative to determine the change in the image information between the video frame 200 (FIG. 2) and the video frame 201 (FIG. 2) based on a pixel to pixel comparison or sum of differences of 2 co-located 8×8 blocks or between co-located macro-blocks. A suitable percentage difference, for example, but not limited to, 50-85% difference, may be set as a limit for determining significant enough changes to warrant a change in the value of the variable 34.

Figure 7:
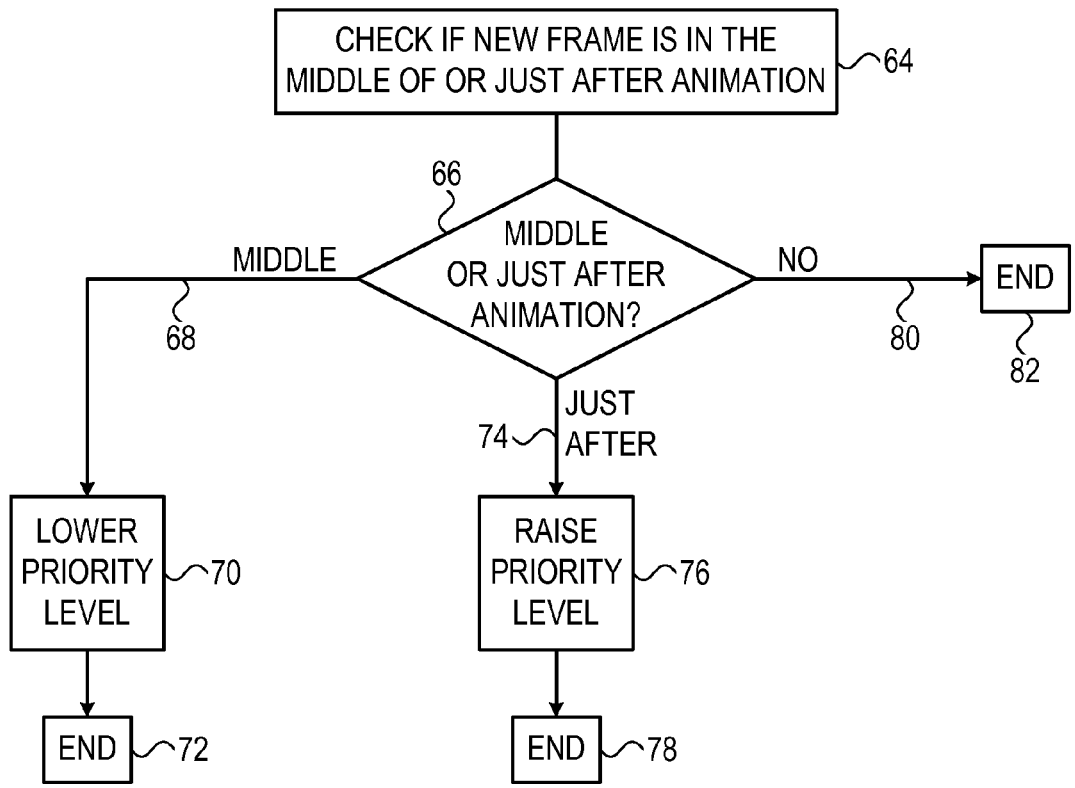
FIG. 7 is a flow chart of a method for checking for animation in the system of FIG. 1.

Reference is now made to FIG. 7, which is a flow chart of a method for checking for animation in the system 10 of FIG. 1.

The processor 20 (FIG. 4) is operative to check if the video frame 201 (FIG. 2) includes video content forming part of an animation sequence or is one video frame after video content forming part of an animation sequence (block 64 and decision block 66).

If the video frame 201 (FIG. 2) includes video content forming part of an animation sequence (branch 68), the processor 20 (FIG. 4) is operative to change the value of the variable 34 (FIG. 3) to a value of a lower priority level (block 70) but not as low as the priority level assigned to the video frame 200 (FIG. 2) and then the test is completed (block 72). So if for example, the value of the variable 34 was set at 6 prior to the animation test, then the value of the variable may be set to a value corresponding to priority level 8 (one higher than the priority level assigned to the video frame 200) as a result of the animation test.

If the video frame 201 (FIG. 2) is one video frame after video content forming part of an animation sequence (branch 74), the processor 20 (FIG. 4) is operative to change the value of the variable 34 (FIG. 3) to a value of a higher priority level (block 76) and then the test is completed (block 78). So if for example, the value of the variable 34 was set at 6 prior to the animation test, then the value of the variable may be set to a value corresponding to priority level 5 as a result of the animation test. It should be noted that the value could be changed by more than 1.

If the video frame 201 (FIG. 2) is neither during an animation sequence nor one video frame after an animation sequence (branch 80), the test is deemed completed (block 82).

Animation or lack thereof may be determined using any method known to those ordinarily skilled in the art of video processing and image recognition. A publication entitled "Low-complexity and low-latency animation detection in screen content video", published as an IP.com Prior Art Database Disclosure with IP.com Disclosure Number IPCOM000237811D provides one method for determining animation in a video sequence.

Figure 8:
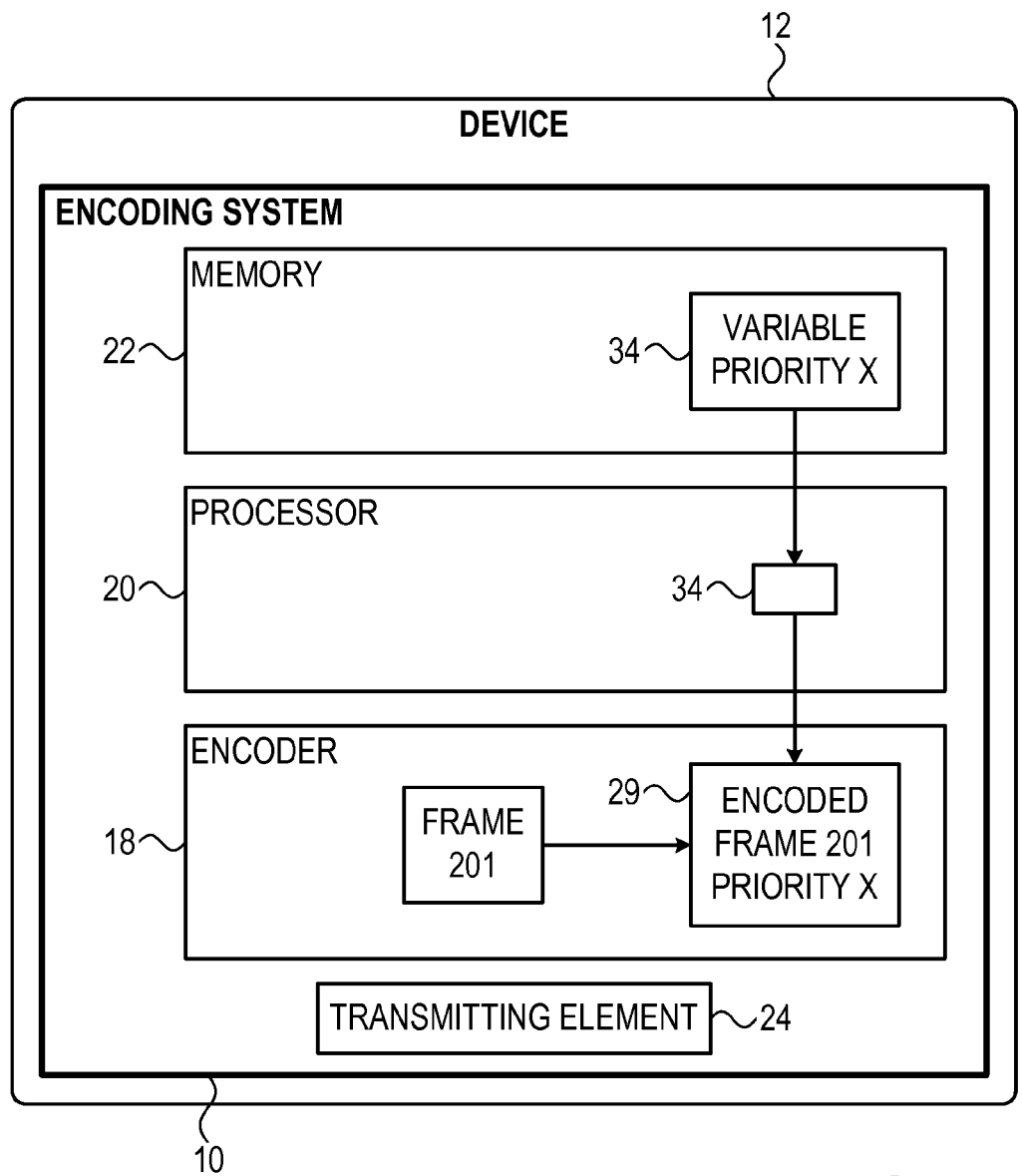
FIG. 8 is a partly pictorial, partly block diagram view of the system of FIG. 1 assigning a priority level to an encoded frame.

Reference is now made to FIG. 8, which is a partly pictorial, partly block diagram view of the system 10 of FIG. 1 assigning a priority level to an encoded frame 201.

In additional to any of the above tests described with reference to FIGS. 4-7, if the variable 34 is going to be changed to a value of the highest priority level, and the data volume of encoding the video frame 201 as an independently encoded frame (e.g.: IDR) is too high or the frame interval between the current frame and the previous independently encoded frame is too small (for example, there is a previously independently encoded frame which has not yet been sent by the transmitting element 24) then the value of the variable 34 may be changed to the value of a lower priority level so that the video frame 201 will not be encoded as an independently encoded frame and/or the bitrate of the video frame 201 may be reduced so that the data volume of encoding the video frame 201 is below a certain limit. The size limit of an independently encoded frame being too high is decided by the system. By way of example only, if a 1

Mbps downlink user is the largest downlink in the current conference, and the tolerable delay of the 1 Mbps downlink is 2 seconds, then the bit rate limit of the highest priority layer may be 2 Mbps.

Optionally, the processor 20 may check if all the priority levels will increase the estimated delay. In such a case, the processor 20 is operative to set the variable 34 to a value equal to the value of the lowest priority level.

Therefore, if the value of the variable 34 is going to be set to be equal to the highest priority level, the processor 20 is operative to check if there is still an encoded video frame with the highest priority level which has not been sent by the device 12 and/or if the data volume of encoding the video frame 201 as an independently encoded frame (e.g.: IDR) is too high. If there is still an encoded video frame with the highest priority level which has not been sent by the first device and/or the data volume of encoding the video frame 201 as an independently encoded frame (e.g.: IDR) is too high, the processor 20 is operative to set the value of the variable 34 to a value of a lower priority level than the highest priority level and/or decrease a bitrate of the video frame 201 compared with the video frame 200 when encoding the video frame 201.

The video encoder 18 is operative to encode the video frame 201, being the most recent video frame to be presented from the live video stream for encoding after the video frame 200 (FIG. 2), yielding an encoded video frame 201 (block 29) having a priority level equal to a value of the variable 34 which is now retrieved from the memory 22 by the processor 20 and transferred to the video encoder 18. Therefore, if the estimated time delay 26 (FIG. 3) exceeds the pre-defined tolerable delay 32 (FIG. 3), the video encoder 18 is operative to encode the video frame 201 with a higher priority level than the priority level of the video frame 200.

It should be noted that the tests of FIGS. 4-7 which are used to change the priority level of the encoded frame 201 may optionally be applied to a portion of the whole priority range and not to the whole priority range. For example, given an original dynamic range of 0-15, the method described hereinabove may be used to only change the priority level to a sub-range of the priorities, for example, priority levels 5-14. The priority levels 0-4 and 15 in the original range may be decided by other methods. The frames of priority levels 0-4 will still be considered existing highest priority frames. The above options are typically user defined.

In practice, some or all of these functions may be combined in a single physical component or, alternatively, implemented using multiple physical components. These physical components may comprise hard-wired or programmable devices, or a combination of the two. In some embodiments, at least some of the functions of the processing circuitry may be carried out by a programmable processor under the control of suitable software. This software may be downloaded to a device in electronic form, over a network, for example. Alternatively or additionally, the software may be stored in tangible, non-transitory computer-readable storage media, such as optical, magnetic, or electronic memory.

It is appreciated that software components may, if desired, be implemented in ROM (read only memory) form. The software components may, generally, be implemented in hardware, if desired, using conventional techniques. It is further appreciated that the software components may be instantiated, for example: as a computer program product or on a tangible medium.

In some cases, it may be possible to instantiate the software components as a signal interpretable by an appropriate computer, although such an instantiation may be excluded in certain embodiments of the present invention.

It will be appreciated that various features of the invention which are, for clarity, described in the contexts of separate embodiments may also be provided in combination in a single embodiment. Conversely, various features of the invention which, for brevity, are described in the context of a single embodiment may also be provided separately or in any suitable sub-combination.

It will be appreciated by persons skilled in the art that the present invention is not limited by what has been particularly shown and described hereinabove. Rather the scope of the invention is defined by the appended claims and equivalents thereof.

What is claimed is:

1. A first device comprising:
    a video encoder to:
        encode a first video frame of a live video stream yielding an encoded first video frame for sending to a second device;
        assign a first priority level to the first video frame; and
        encode a second video frame of the live video frame yielding an encoded second video frame for sending to the second device, the second video frame being a most recent video frame to be presented from the live video stream for encoding after the first video frame; and
    a processor to:
        determine if an estimate of a time delay exceeds a pre-defined delay, the time delay being a time for data in the live video stream to be transferred from the first device to the second device, and
        assign a priority level which is higher than the first priority level to the second video frame in response to the estimate of the time delay exceeding the pre-defined delay.

2. The first device according to claim 1, wherein if the estimate of the time delay exceeds the pre-defined delay, the processor is operative to assign a second priority level to a variable, the second priority level being a higher priority level than the first priority level, wherein the video encoder is operative to encode the second video frame yielding the encoded second video frame having a priority level equal to a value of the variable.

3. The first device according to claim 1, wherein the time delay is a time from encoding of a video frame in the live video stream in the first device to rendering of the video frame of the live video stream by the second device.

4. The first device according to claim 1, wherein the processor is operative to determine the pre-defined delay of data of the live video stream being transferred from the first device to the second device.

5. The first device according to claim 1, wherein the processor is operative to estimate the time delay.

6. The first device according to claim 2, wherein the processor is operative to:
    determine or estimate if image information in the second video frame has changed with respect to the first video frame more than a first limit; and
    if it was determined or estimated that the image information in the second video frame has changed with respect to the first video frame more than the first limit, change the value of the variable to a value of a higher priority level.

7. The first device according to claim 6, wherein the processor is operative to estimate the change in the image information between the first video frame and the second video frame based on a textual difference between an image of the first video frame and an image of the second video frame.

8. The first device according to claim 7, wherein the textual difference includes a change in title.

9. The first device according to claim 6, wherein the processor is operative to determine the change in the image information between the first video frame and the second video frame based on a pixel to pixel comparison.

10. The first device according to claim 6, wherein the processor is operative to: find a third priority level of the priority levels, having a value equal to, or higher than, the value of the variable, such that at least X of the previously encoded video frames within a second limit do not include the third priority level; and change the value of the variable to the value of the third priority level.

11. The first device according to claim 10, wherein the second limit is equal to X previously encoded video frames, one-after-another, without breaks, starting from a frame immediately prior to the first encoded video frame.

12. The first device according to claim 6, wherein the processor is operative to:
    (a) check if there are more than X previously encoded video frames within a second limit having a priority level equal to the value of the variable; and
    (b) if there are more than X previously encoded video frames within a certain limit having a priority equal to the value of the variable, change the value of the variable to a value of a higher priority level and repeat step (a).

13. The first device according to claim 6, wherein the processor is operative to:
    check if the second video frame includes video content forming part of an animation sequence; and
    if the second video frame includes the video content forming part of the animation sequence, change the value of the variable to a value of a lower priority level but not as low as the first priority level.

14. The first device according to claim 6, wherein the processor is operative to:
    check if the second video frame is one video frame after video content forming part of an animation sequence; and
    if the second video frame is one video frame after the video content forming part of the animation sequence, change the value of the variable to a value of a higher priority level.

15. The first device according to claim 2, wherein the processor is operative to: find a third priority level of the priority levels, having a value equal to, or higher than, the value of the variable, such that at least x of the previously encoded video frames within a second limit do not include the third priority level; and change the value of the variable to the value of the third priority level.

16. The first device according to claim 15, wherein the second limit is equal to X previously encoded video frames, one-after-another, without breaks, starting from a frame immediately prior to the first encoded video frame.

17. The first device according to claim 15, wherein the processor is operative to:
    check if the second video frame includes video content forming part of an animation sequence; and
    if the second video frame includes the video content forming part of the animation sequence, change the value of the variable to a value of a lower priority level but not as low as the first priority level.

18. The first device according to claim 15, wherein the processor is operative to:
    check if the second video frame is one video frame after video content forming part of an animation sequence; and
    if the second video frame is one video frame after the video content forming part of the animation sequence, change the value of the variable to a value of a higher priority level.

19. The first device according to claim 2, wherein if the value of the variable is going to be set to be equal to a highest priority level, the processor is operative to check if there is still an encoded video frame with the highest priority level which has not been sent by the first device; and
    if there is still an encoded video frame with the highest priority level which has not been sent by the first device, the processor is operative to set the value of the variable to a value of a lower priority level than the highest priority level.

20. The first device according to claim 19, wherein if there is still an encoded video frame with the highest priority level which has not been sent by the first device, the processor is operative to decrease a bitrate of the second video frame compared with the first video frame when encoding the second video frame.

21. A method in a first device, the method comprising:
    encoding a first video frame of a live video stream yielding an encoded first video frame for sending to a second device;
    assigning a first priority level to the first video frame;
    encoding a second video frame of the live video stream yielding an encoded second video frame for sending to the second device, the second video frame being a most recent video frame to be presented from the live video stream for encoding after the first video frame;
    determining if an estimate of a time delay exceeds a pre-defined delay, the time delay being a time for data in the live video stream to be transferred from the first device to the second device; and
    assign a priority level which is higher than the first priority level to the second video frame in response to if the estimate of the time delay exceeding the pre-defined delay.

* * * * *

UNITED STATES PATENT AND TRADEMARK OFFICE
CERTIFICATE OF CORRECTION

PATENT NO. : 9,774,650 B2  
APPLICATION NO. : 14/493408  
DATED : September 26, 2017  
INVENTOR(S) : Sijia Chen et al.

Page 1 of 1

It is certified that error appears in the above-identified patent and that said Letters Patent is hereby corrected as shown below:

In the Claims

Column 12, Claim 21, Line(s) 54-55, "to if the" to read as --to the--.

Signed and Sealed this  
Fourteenth Day of November, 2017

Joseph Matal  
*Performing the Functions and Duties of the*  
*Under Secretary of Commerce for Intellectual Property and*  
*Director of the United States Patent and Trademark Office*